Jan. 24, 1928.
J. F. McGUIRE
1,657,406
DEFLATION INDICATOR
Filed May 25, 1925 2 Sheets-Sheet 2
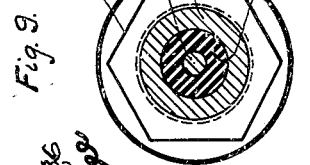
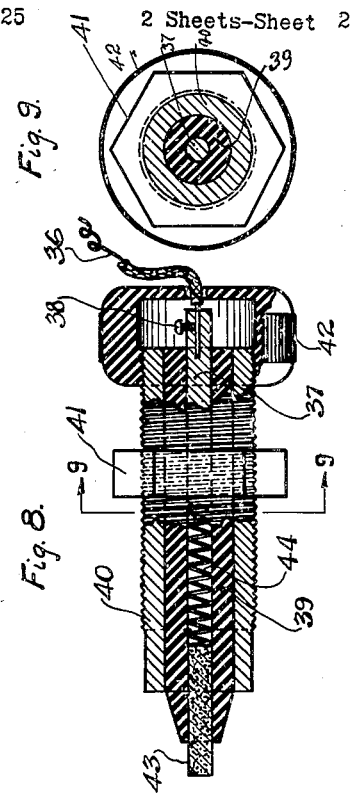
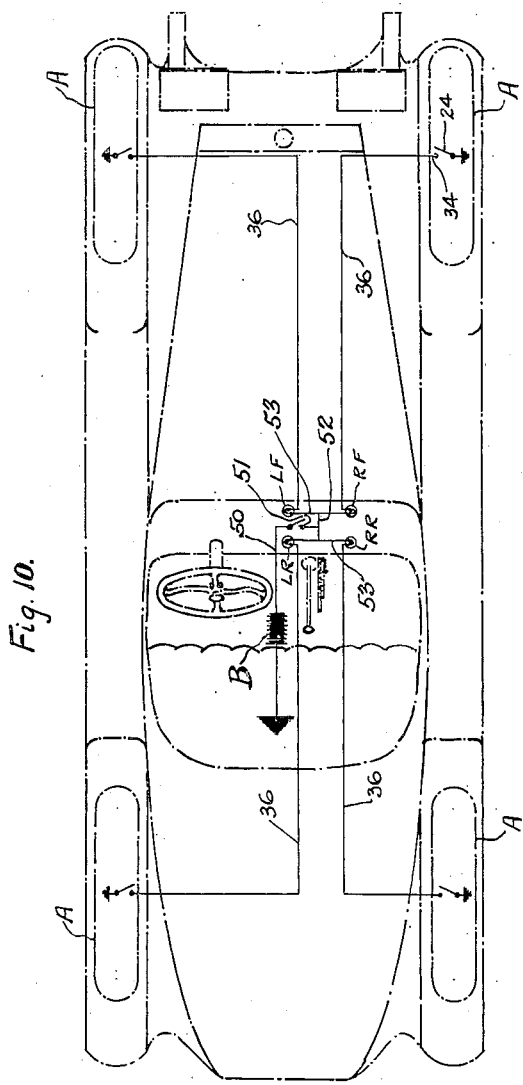
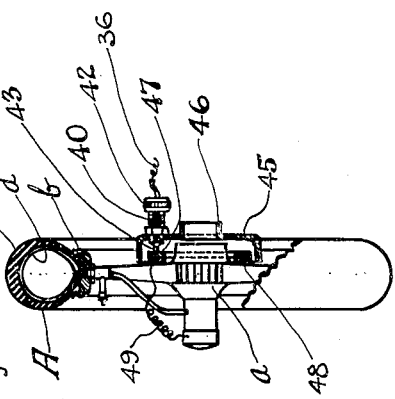
J. F. McGuire.
INVENTOR
BY Victor J. Evans
ATTORNEY Patented Jan. 24, 1928.

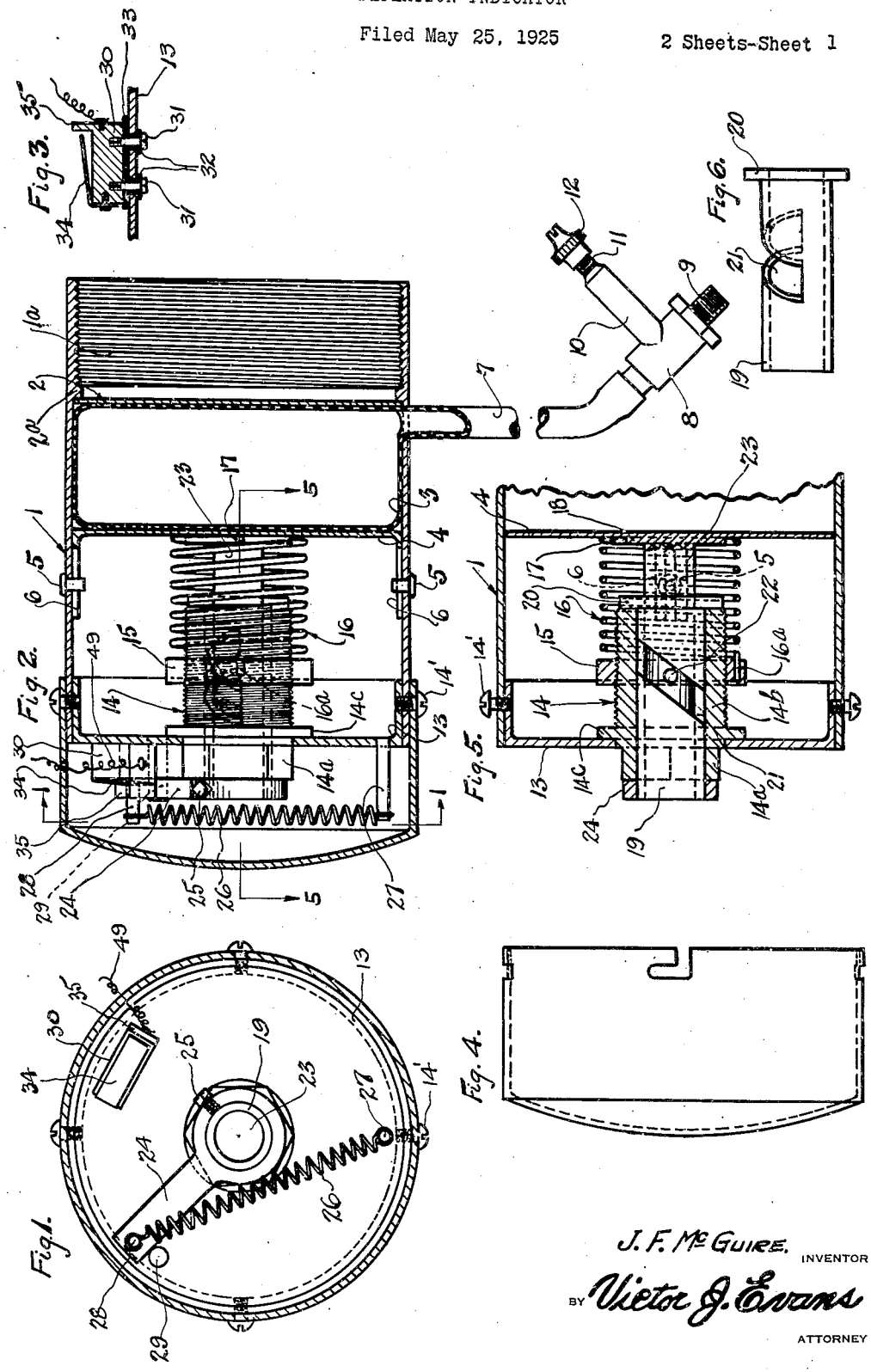

1,657,406

UNITED STATES PATENT OFFICE.

JAMES F. McGUIRE, OF KITTANNING, PENNSYLVANIA.

DEFLATION INDICATOR.

Application filed May 25, 1925. Serial No. 32,803.

This invention relates to devices for indicating when the pressure of automobile tires is below the proper operating point, and more particularly to what I term a deflation indicator.

One of the main objects of the invention is to provide simple and efficient means which can be readily applied to automobile tires of standard construction for indicating when the air pressure in the tire is below the proper operating point. A further object is to provide means of this character which can be applied and which will indicate accurately which tire is below proper operating pressure. A further object is to provide means of the character stated which can be readily mounted upon an automobile wheel of standard construction and can be connected to the tire in such manner as to permit the tire to be inflated in the usual manner. Further objects will appear from the detail description.

In the drawings:—

Figure 1 is a section taken substantially on line 1—1 of Fig. 2;

Figure 2 is a central longitudinal section through the device, parts being shown in elevation;

Figure 3 is a sectional detail of the mounting of the contact block;

Figure 4 is a detail of the cover member or cap;

Figure 5 is a fragmentary section taken substantially on line 5—5 of Fig. 2, parts being omitted;

Figure 6 is a detail of the guide sleeve;

Figure 7 is a detail, partly in section, of the device as applied;

Figure 8 is a detail, partly in section, of one of the wheel brush devices;

Figure 9 is a section taken substantially on line 9—9 of Fig. 8;

Figure 10 is a diagrammatic view showing the arrangement of the signaling devices.

The device includes a body or casing 1 of cylindrical or any other suitable or preferred shape which is interiorly threaded at its inner end at $1^a$ to be screwed onto the hub $a$ of a wheel A in place of the usual hub cap. A disc 2 is mounted within body 1 and seats on a shoulder $2^a$ provided at the inner end of the threaded portion $1^a$. An elastic container or bag 3 is mounted within body 1 and is confined between partition member 2 and a piston in the form of a disc 4 which is slidably mounted in the body for movement longitudinally thereof, this piston being guided by pins 5 which are secured in the body and extend through slots in arms 6 which project from piston 4 toward the outer end of the body, these arms being disposed diametrically opposite each other. Bag 3, which is formed of rubber or other suitable elastic material, is connected by a length of tubing 7 to a T-connection 8 the head of which is provided with an exteriorly threaded portion 9 which is threaded into inflating valve tube or casing $b$ of a pneumatic tire C of known construction, the usual valve and stem being removed from valve casing $b$ before member 9 is threaded into the same. A valve casing 10 communicates with the body of the T-connection 8 and a valve and valve stem of known construction are mounted in casing 8, this valve and stem corresponding to the valve and stem which were removed from the casing $b$. Casing 10 is provided at its outer end with an exteriorly threaded neck 11 which receives a valve cap 12 of known construction. By removing cap 12 the tire can be inflated by means of the T-connection 8 and the casing $b$ communicating therewith, the body of the T-connection and tube 7 establishing direct communication between the elastic bag 3 and the tube $d$ of the tire so that the extent to which the bag 3 is inflated will vary in direct accordance with the amount of inflation of the tube $d$ of the tire C.

A flanged cylindrical head 13 is secured in the outer end of body 1 by means of screws 14', or in any other suitable or preferred manner. A barrel 14 extends through head 13 and is provided, adjacent the head, with a rectangular portion $14^a$ forming means for rotating the barrel by fitting a wrench or other suitable tool about element $14^a$. A collar 15 is screwed onto the body portion $14^b$ of the barrel which is exteriorly threaded to receive this collar. An expansion coil spring 16 is mounted about the inner portion of the barrel and is confined between collar 15 and piston 4. The collar is provided with a recess which receives a finger $16^a$ at the outer end of spring 16 and the inner end portion of the spring is bent to form a finger 17 which fits into a slot in a boss 18 at the central portion of piston 4. The spring and collar are thus held against turning movement and the spring is confined so as to exert pressure upon piston 4, outward movement of barrel 14 through head 13 being positively limited by an outer annular flange 14ᶜ provided on the barrel for this purpose, this flange contacting with the inner face of the head. Rotating barrel 14 in proper direction adjusts collar 15 to give the required tension of spring 16.

A sleeve 19 extends through barrel 14 and is mounted therein for free turning movement, outward movement of this sleeve through the barrel being limited by an annular shoulder 20 provided at the inner end of the sleeve. This sleeve is provided with an inclined slot 21 extending about the sleeve and this slot receives a pin 22 carried by a stub-shaft 23 which extends from boss 18 of piston 4, this stub-shaft being formed integrally with the boss and piston or being rigidly secured thereto in any other suitable or preferred manner. A contact arm 24 is secured by a set screw 25 or in any other suitable or preferred manner, on the outer end of sleeve 19 which projects a short distance beyond barrel 14, and this arm serves to hold the sleeve against endwise movement inwardly of the barrel. A tension spring 26 is secured at one end to a post 27 which is secured in head 13 and the other end of this spring is secured to a pin 28 secured in arm 24 adjacent the free end thereof. This spring is so positioned that its line of tension is at one side of the center of sleeve 19 and it will act to complete the throw of arm 24 in either direction when the arm has been moved into position to bring the line of tension of the spring beyond the center of the sleeve, after which the spring acts to hold the arm in the position into which it has been moved. Movement of the arm in circuit opening direction is limited by a stop 29 secured in head 13. A contact block 30 is mounted on head 13 remote from stop 29, this block being secured in position by screws 31 which pass through thimbles 32 of electrical insulating material extending through head 13, a strip 33 of insulating material being positioned between the block and the head. This provides means whereby the block is firmly secured to head 13 and is effectually electrically insulated therefrom. A leaf spring 34 is secured to one end of the block and extends above the outer face thereof, the block being provided at its other end with an outwardly projecting stop flange 35. The block 30 and spring 34, as well as the arm 24, sleeve 19 and associated parts including the body 1 are all formed of electrical conducting material. When the arm 24 is in the position illustrated in Figure 1 it is out of contact with spring 34 and the electrical circuit which includes the arm and this spring is open. When the arm is moved in a direction away from stop 29 a sufficient distance to bring the line of tension of spring 26 beyond the center of sleeve 19, the spring completes the throw of the arm toward block 30, movement of the arm in this direction being limited by flange 35. When the arm is in this position it is in contact with spring 34 and the circuit is closed.

A lead 36 is connected to a rod 37 of electrical conducting material, the end portion of lead 36 being secured in the rod by a set screw 38 or in any other suitable or preferred manner. Rod 37 is secured in a tube 39 of electrical insulating material, this tube being enclosed in a protecting casing 40 which is exteriorly threaded to receive a jamb nut 41. A closure member 42 of electrical insulating material is threaded onto the inner end portion of casing 40 and encloses the inner end portion of rod 37 and associated parts, this closure member being provided with an opening to accommodate lead 36. A carbon brush 43 is slidably mounted in tube 39 and is urged outwardly of the same by an expansion coil spring 44 mounted within the tube and confined between the brush 43 and rod 37. Casing 40 is threaded through an opening provided for this purpose in a protecting casing or drum 45 carried by axle housing 46 of the automobile, this drum constituting the brake drum if desired or being supplemental thereto, as preferred. A drum 45 is provided for the front wheels of the automobile as well as for the rear wheels thereof. The casing 40 after being screwed into the drum 45 to the proper extent is locked in position by jamb nut 41. The carbon brush 43 contacts with a ring 47 of electrical conducting material which is mounted upon a supporting ring 48 of electrical insulating material which is secured to wheel A concentric with hub a in any suitable or preferred manner. Block 30 is connected by a lead 49 to ring 47. A battery B or any other suitable source of electrical energy has one pole grounded, as indicated in Figure 10, the other pole of this battery being connected by a wire 50 to a switch 51 of suitable type. The other side of switch 51 is connected by a short lead 52 to leads 53 which connect the lights "LF" and "RF" and the lights "RR" and "LR", respectively. The other side of each light is connected by a lead 36 previously referred to to the corresponding wheel brush device above described in detail.

When all of the tires are inflated to the proper extent the pressure in the bag 3 is sufficient to overcome the counter pressure of spring 16 so that arms 24 of the respective devices are in their open position, as indicated in the diagram in Figure 10. When the air pressure in any tire becomes too low for proper operating conditions, the pressure in bag 3 is correspondingly reduced so that the spring 16 acts to cause inward movement of piston 4 forcing the stub-shaft 23 through sleeve 19. As sleeve 19 is held against endwise movement and stub-shaft 23 is held against turning movement due to its being rigidly secured to piston 4, pin 22 will contact with the inner inclined edge or wall of slot 21 during inward movement of stub-shaft 23 turning the sleeve 19 in such direction and through such a distance as to turn arm 24 in circuit closing direction a sufficient distance to bring the line of tension of spring 26 beyond the center of sleeve 19, after which this spring will act to complete the throw of arm 24 bringing it into contact with spring 34, in which position the arm is held by the action of the spring. This closes the circuit which includes the device carried by the wheel on which the tire which requires attention is mounted. For example, referring to Figure 10, if it be assumed that the left front tire has become dangerously underinflated, the circuit through the device of the left front wheel will be closed, the switch 51 being closed as it normally would be, thus closing the circuit through the light marked "LF" and giving a visual signal to the driver so that he could determine at a glance which tire required attention. In the same manner, if any one of the four tires becomes underinflated the signal will operate to notify the driver of this fact and will indicate accurately which tire is underinflated. As indicated in Figure 10, the lights and the switch are preferably mounted on the instrument board in front of the driver though they may be placed in any other suitable or preferred position without in any way affecting the operation of the signaling or indicating means.

As will be understood, and as above indicated, changes in construction and arrangement of parts of the invention may be resorted to without departing from the field and scope of the same, and I intend to include all such variations, as fall within the scope of the appended claims, in this application in which a preferred form only of my invention is disclosed.

What I claim is:—

1. In indicating means of the character described, a casing adapted to be secured on the hub of an automobile wheel, a partition member mounted in the casing, a piston slidable in the casing, an elastic air-tight bag confined between said member and the piston, means for establishing communication between said bag and the tube of a pneumatic tire, a contact member, a contact arm movable into and out of contact with the contact member, means for completing the throw of the arm when it has been moved beyond dead center in either direction and for holding it in thrown position, means pressing the piston toward the bag while permitting movement of the piston in the opposite direction, and means controlled by movement of the piston for moving the contact arm beyond dead center in either direction in accordance with the movement of the piston.

2. In indicating means of the character described, a casing adapted to be secured on the hub of an automobile wheel, a partition member mounted in the casing, a piston slidable in the casing, a head secured in the casing beyond the piston, a barrel rotatably mounted through the head, a collar threaded on the barrel, outward movement of the barrel through the head being positively limited, an expansion spring confined between the collar and the piston, the ends of the spring being secured to the collar and the piston, respectively, a sleeve mounted through the barrel for turning movement and having its outward movement through the barrel positively limited, said sleeve being provided with an inclined slot, a stub-shaft fixedly secured to the piston and extending through the sleeve, said shaft being provided with a pin extending into the slot and contacting with the sides thereof, a contacting arm secured on the outer end of the sleeve in contact with the outer end of the hub, a contact member mounted on the head and electrically insulated therefrom, said contact member being positioned for contact with the arm when the arm is moved into its extreme position in one direction, means for completing the throw of the arm when it has moved beyond dead center in either direction and for holding it in thrown position, an air-tight elastic bag confined between the partition member and the piston, and means for establishing communicating between said bag and the tube of a pneumatic tire.

3. In an indicating device of the character described, a casing adapted to be secured to the hub of an automobile wheel, a partition mounted in the casing, a piston elastically and slidably mounted in the casing, a pipe establishing communication with the inflated pneumatic tire, a rotary spring-controlled contact arm movable over center to make and break an electric circuit to show the tire condition.

In testimony whereof I affix my signature.

JAMES F. McGUIRE.